United States Patent Office 3,546,298
Patented Dec. 8, 1970

3,546,298
PRODUCTION OF ALKANOLAMINES
John B. Tindall, Terre Haute, Ind., assignor to Commercial Solvents Corporation, New York, N.Y., a corporation of Maryland
No Drawing. Filed Mar. 15, 1968, Ser. No. 713,288
Int. Cl. C07c 89/00, 89/04; C07d 85/00
U.S. Cl. 260—584                                                                 3 Claims

ABSTRACT OF THE DISCLOSURE

An improved process for the production of primary aminoalkanediols having substantially reduced secondary aminoalkanediol content by condensing a primary nitroalkane and formaldehyde in a mole ratio of 0.52–0.55:1 to produce a nitroalkanediol having minimal free formaldehyde, and reducing the nitroalkanediol to produce primary aminoalkanediol in high purity and yield.

BACKGROUND OF THE INVENTION

This invention relates to an improved process for the production of primary aminoalkanediols. In a particular aspect, this invention relates to the production of primary aminoalkanediols having substantially reduced secondary aminoalkanediol content.

Aminoalkanediols corresponding to the formula

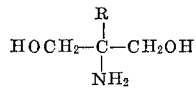

where R is methyl or ethyl, are used in the preparation of synthetic drying oils in accordance with W. A. Jordan et al., U.S. Pat. 2,559,440, and R. F. Purcell, U.S. Pat. 3,248,397. According to these inventors, the aminoalkanediol, 1 mole, was reacted with 1 or 2 moles of an unsaturated fatty acid to produce a 2-oxazoline which was then reacted with formaldehyde to produce a vinyl oxazoline. Some products prepared in this manner have excellent properties similar to natural drying oils and have been well accepted by the coatings, industry. However, they have the disadvantage of a rather dark color which has limited them to dark coatings where the color is not objectionable.

Several sources of color-producing impurities have been identified in aminoalkanediols. One group is removed by treatment of the alkanolamine with a non-ionic cross-linked polystyrene polymer. Another group includes monohydroxyaminoalkanes, such as 2-amino-1-butanol and 2-amino-2-methyl-1-propanol, removable by distillation. A third cause of color in the vinyl oxazoline is the N-methyl derivative of the aminodiol which may be present to the extent of 5–10%.

Aminoalkanediols are prepared from the corresponding nitroalkanediols by hydrogenation in the presence of a catalyst. The nitroalkanediols are in turn prepared by condensing a mole of a primary nitroalkane with 2 moles of formaldehyde in the presence of an alkaline catalyst and a solvent. The reaction tends to result in an equilibrium mixture of the monohydroxy compound and the diol. According to the prior art, e.g. B. M. Vanderbilt, U.S. Pat. 2,132,330, an excess of formaldehyde was employed in preparing the diol to insure a complete reaction free from the monohydroxy compound. When the nitroalkanediol solution containing free formaldehyde is hydrogenated to the corresponding aminoalkanediol, the excess formaldehyde condenses with the amino group to give a substantial proportion of N-methyl-aminoalkanediol.

Aminoalkanediols are difficult to purify. They are highly soluble in water and can be purified by recrystallization, but costs are prohibitive for most applications. Losses of product are high and because concentrated solutions must be employed, impurities, especially alkylated derivatives, tend to crystallize with the product. Some of the impurities are sufficiently volatile as to be removable by distillation, but the N-monoalkylated derivatives distill at nearly the same temperature as the primary compounds and hence cannot be removed satisfactorily.

It is an object of this invention to provide an improved process for the production of primary aminoalkanediols.

It is another object of this invention to provide a process for the production of primary aminoalkanediols having substantially reduced content of secondary aminoalkanediols.

A third object of this invention is to provide light-colored synthetic drying oils.

An improvement has been discovered in the process for the production of primary aminoalkanediols whereby the content of secondary aminoalkanediol is substantially reduced. The primary aminoalkanediol is produced, as is known, by the reduction of the corresponding nitroalkanediol by hydrogenation in the presence of a hydrogenation catalyst. The nitroalkanediol is produced by the condensation of about a mole of a primary nitroalkane having 2 or 3 carbon atoms with about 2 moles of formaldehyde in the presence of an alkaline catalyst. According to the present invention, the substantially-reduced secondary aminoalkanediol content is effected by conducting the condensation of nitroalkane and formaldehyde in the presence of a slight excess of nitroalkane instead of the excess of formaldehyde of the prior process. The primary aminoalkanediol thereby obtained is particularly suitable for the preparation of drying oils.

DETAILED DISCUSSION

The condensation of nitroalkane with formadehyde may be carried out in accordance with the previous process except that a small molar excess of nitroalkane is provided in place of the excess formaldehyde used previously. The previous process is described by B. M. Vanderbilt, U.S. Pats. 2,132,330; 2,135,444; and 2,139,120, which description is incorporated herein by reference thereto. According to this process, the condensation is carried out in the presence of a base, such as sodium hydroxide, sodium carbonate, tertiary amines, calcium oxide, calcium hydroxide, barium oxide or barium hydroxide. Previously methanol was used to provide a homogeneous solution. The use of methanol is optional, however, and in the preferred embodiment it is not used.

According to the present invention, the nitroalkane is present in at least about 4 mole percent excess, and up to 10 mole percent excess, above the stoichiometric molar ratio of 0.5:1. The preferred molar ratio, therefore, is from 0.52 to 0.55 mole of nitroalkane per mole of formaldehyde.

In effecting the condensation of nitroalkane and formaldehyde, the nitroalkane and catalyst are charged to a reaction vessel equipped with a temperature control means and an agitator control means. Formaldehyde from a formaldehyde source, i.e. the 37 or 44% solution of commerce or paraformaldehyde, is slowly added. When paraformaldehyde is used as the formaldehyde source, it is slurried with approximately 1–2 times its weight of water before adding to the reaction mixture. The reaction is exothermic and once begun, some cooling may be necessary. However, at the beginning some heating may be necessary to initiate the condensation. In general, the temperature should be maintained within the range of 25 to 50° C., preferably from 40–50° C. After addition of formaldehyde is complete, the reaction period is continued until condensation to nitroalkanediol is determined to be substantially complete. Usually a period of 3–4 hours is sufficient.

When the condensation is complete, the reaction mixture containing the nitroalkanediol and excess nitroalkane is delivered to a hydrogenation unit, nickel catalyst is added, and the nitroalkanediol is reduced to the aminoalkanediol at a pressure of about 1000 p.s.i.g. of hydrogen and at a temperature of 70° C. During this reaction, the excess nitroalkane is reduced to a primary amine. Hydrogenation is complete when the pressure becomes steady.

The hydrogenation unit is then vented and the aminoalkanediol solution is delivered to a distillation kettle equipped with a condenser and a take-off head. The reaction mixture is heated to 150° C. at reduced pressure, e.g. about 15 mm., to strip off the alcohol, water and low-boiling amines. These aminoalkanediols should not be heated appreciably above about 150° C. because at higher temperatures some decomposition occurs leading to a dark color.

After stripping the aminoalkanediol of low-boiling substances, it is diluted with water to within about 15 to about 40% of amine and is then contacted with a non-ionic, cross-linked polystyrene polymer capable of adsorbing the remaining malodorous, color-producing impurities.

Contact with the resin can be effected by any satisfactory means, several of which are known. Preferably, the solution is passed continuously through a bed of the resin until the effluent approaches the quality of the feed. The effluent is then evaporated in an evaporator to remove the water, as is known in the art, and is then suitable for use in drying oil synthesis.

The term "substantially reduced content" is intended to mean that although the proportion present is considerably less than before, nonetheless it is not completely eliminated. A reduction by half would be regarded as "substantially reduced content."

The practice of this invention is further illustrated by the following examples.

EXAMPLE 1

2-nitro-2-ethyl-1,3-propanediol (NEPD) was prepared by mixing 12 g.-moles of 37% formaldehyde and 0.027 g.-mole of sodium hydroxide and gradually adding, with stirring, 5.85 g.-moles of 1-nitropropane (mole ratio of 0.487 1-nitropropane to formaldehyde) over a period of 60 minutes at 45° C. The resulting NEPD solution was passed through a column of Amberlite IR 120 cation exchange resin to remove the caustic catalyst and was then passed to a hydrogenation unit. The 2-nitro-2-ethyl-1,3-propanediol was reduced to 2-amino-2-methyl-1,3-propanediol was reduced to 2-amino-2-ethyl-1,3-propanediol was reduced to 2-amino-2-ethyl-1,3-pronickel catalyst (50 g.) and methanol (2 liters), at 70° C. and at a pressure of 600 p.s.i.g. The product was filtered to remove catalyst and the water was removed by distillation at a liquid temperature of 156° C. at 15 mm. Hg pressure.

The experiment was repeated except that 6.46 moles of 1-nitropropane were used instead of 5.85 moles to give a mole ratio of 0.538.

The residual AEPD was assayed for 2-monomethyl-amino-2-ethyl-1,3-propanediol and the products were converted to oxazoline esters and vinyl oxazolines and the colors of the resulting products were compared.

| | | |
|---|---|---|
| Moles 1 nitropropane per mole HCHO | 0.487 | 0.538 |
| Formaldehyde content of NEPD solutions, percent | 1.16 | 0.24 |
| 2-monomethylamino-2-ethyl-1,3-propanediol in product, percent | 7.2 | 2.4 |
| Gardner color of oxazoline ester | 3–4 | 2–3 |
| Gardner color of vinyl oxazoline | 9–10 | 7 |

This experiment demonstrated that a substantial reduction in the content of N-alkylated AEPD is obtained when a slight excess of 1-nitropropane is employed in the reaction. The higher purity results in much lighter color of oxazoline derivatives.

EXAMPLE 2

The experiment of Example 1 was repeated except that nitroethane was substituted for 1-nitropropane at mole ratios to formaldehyde of 0.500 and 0.545 respectively in the preparation of 2-nitro-2-methyl-1,3-propanediol (NMPD).

In the reaction at 0.500 mole ratio, 6 g.-moles of 37% formaldehyde was reacted with 3 g.-moles of nitroethane; at the 0.545 mole ratio, the amount of nitroethane used was 3.27 g.-moles. In both cases, the reaction was conducted in the presence of sodium hydroxide as described in Example 1. The resulting NMPD solutions were deionized to remove the catalyst and the NMPD was reduced to 2-amino-2-methyl-1,3-propanediol (AMPD) as described in Example 1. The reduction products were filtered and water was removed by distillation at a liquid temperature of 150° at 15 mm. The residues were evaluated as shown below.

| | | |
|---|---|---|
| Moles nitroethane per mole HCHO | 0.500 | 0.545 |
| Formaldehyde content of NMPD solution, percent | 0.34 | 0.054 |
| 2-monomethylamino-2-methyl-1,3-propanediol in product, percent | 4.8 | 0.9 |
| Gardner color of oxazoline ester | 2–3 | 1–2 |
| Gardner color of vinyl oxazoline | 8 | 7 |

This experiment demonstrates that at stoichiometric ratios, considerable improvement in the product is obtained as compared with the slight excess of formaldehyde as in Example 1. Still further improvement is obtained with a slight excess of nitroethane.

I claim:
1. In the process for the production of an alkanolamine corresponding to the formula

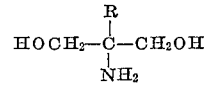

where R is methyl or ethyl, by the steps of condensing a primary nitroalkane having 2 or 3 carbon atoms with formaldehyde in about a 0.5:1 mole ratio in the presence of an alkaline catalyst to form a nitroalkanediol and reducing said nitroalkanediol by hydrogenation in the presence of a nickel catalyst, the improvement comprising effecting said condensation in a mole ratio of about 0.52–0.55 mole of said nitroalkane to said formaldehyde, hydrogenating, thus producing said alkanolamine having a substantially reduced content of secondary aminoalkanediol.

2. The process of claim 1 wherein the nitroalkane is nitroethane and the resulting alkanolamine is 2-amino-2-methyl-1,3-propanediol.

3. The process of claim 1 wherein the nitroalkane is 1-nitropropane and the resulting alkanolamine is 2-amino-2-ethyl-1,3-propanediol.

References Cited

UNITED STATES PATENTS 3,428,684  2/1969  Tindall _____ 260—584

CHARLES B. PARKER, Primary Examiner

R. L. RAYMOND, Assistant Examiner

U.S. Cl. X.R.

260—307

UNITED STATES PATENT OFFICE
CERTIFICATE OF CORRECTION

Patent No. 3,546,298     Dated December 8, 1970

Inventor(s)   John B. Tindall

It is certified that error appears in the above-identified patent and that said Letters Patent are hereby corrected as shown below:

Column 3, lines 50 and 51, "2-methyl-1-3-propropanedio was reduced to 2-amino-2-ethyl-1,3-pro-" should read -- 2-et 1,3-propanediol (AEPD) by hydrogenating in the presence of nickel --.

Signed and sealed this 6th day of April 1971.

(SEAL)
Attest:

EDWARD M. FLETCHER, JR.                WILLIAM E. SCHUYLER,
Attesting Officer                       Commissioner of Paten